United States Patent [19]

Horkey et al.

[11] 4,308,019
[45] Dec. 29, 1981

[54] DRAG CHAIN SPROCKET

[75] Inventors: Edward J. Horkey, Tempe; John R. Marasco, Mesa, both of Ariz.

[73] Assignee: Industrial Chain Products, Inc., Tempe, Ariz.

[21] Appl. No.: 119,517

[22] Filed: Feb. 7, 1980

[51] Int. Cl.³ .................... F16H 55/30; B65G 39/10
[52] U.S. Cl. ...................... 474/162; 474/92; 474/185; 198/834; 29/124
[58] Field of Search ............... 474/162, 92, 185, 152, 474/163; 198/834; 74/448; 29/124, 121.5

[56] References Cited

U.S. PATENT DOCUMENTS

| 277,774 | 5/1883 | Okell ................... 474/162 |
| 1,222,625 | 4/1917 | Hay ..................... 474/162 |
| 1,630,313 | 5/1927 | Rorabeck . | |
| 1,964,780 | 7/1934 | Ziegler ................. 474/162 |
| 2,038,695 | 4/1936 | Wilmot ................. 198/834 |
| 2,599,233 | 6/1952 | Christie ................ 474/163 |
| 2,612,987 | 10/1952 | Sjostrom .............. 198/834 |
| 2,863,323 | 12/1958 | Shaffer . | |
| 3,069,922 | 12/1962 | Harvey . | |
| 3,311,220 | 3/1967 | l'Anson . | |
| 3,363,476 | 1/1968 | Brown ................. 474/185 |
| 3,381,354 | 5/1968 | Krempa et al. . | |
| 3,944,297 | 3/1976 | Stedman .............. 474/162 |
| 4,233,853 | 11/1980 | Holz .................... 474/185 |

FOREIGN PATENT DOCUMENTS

| 7041 | 6/1899 | Norway .............. 474/152 |
| 98859 | 7/1922 | Switzerland ........ 198/834 |
| 456259 | 7/1968 | Switzerland ........ 474/162 |

*Primary Examiner*—Lawrence J. Staab
*Attorney, Agent, or Firm*—Warren F. B. Lindsley

[57] ABSTRACT

An improved drag chain sprocket comprising two spaced-apart discs on a hub with removable teeth bolted to the discs. The open design of the sprocket prevents build-up of abrasive materials between the sprocket and the chain. The mounting position of the teeth may be altered to utilize unworn surfaces, thereby extending the working life of the sprocket.

10 Claims, 8 Drawing Figures

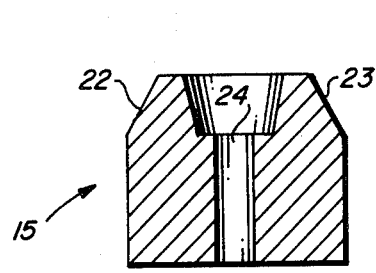
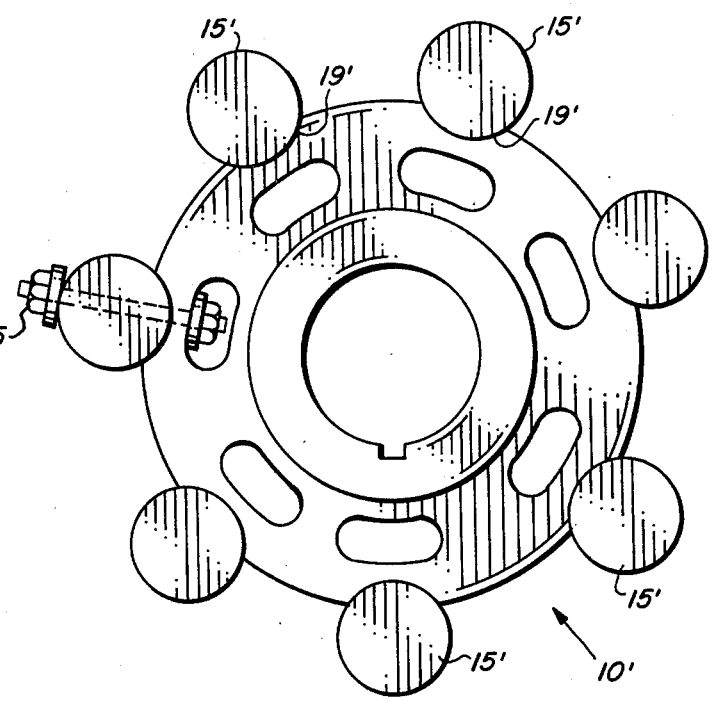
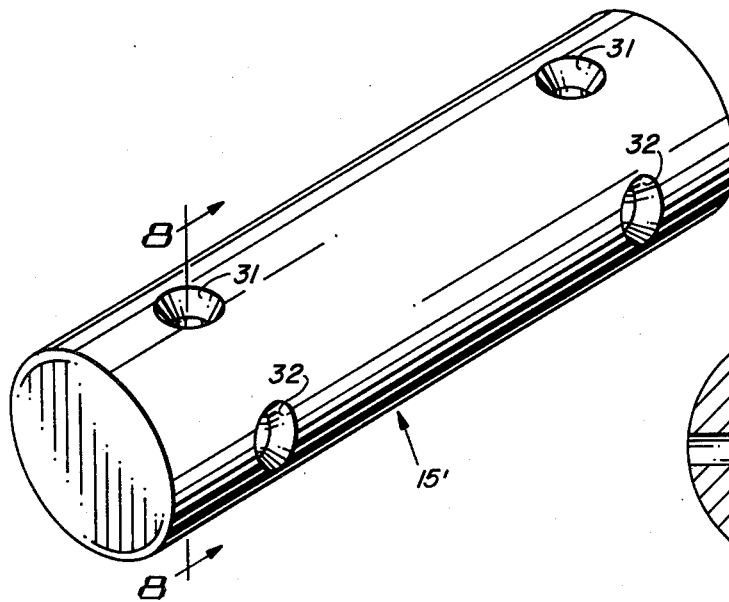
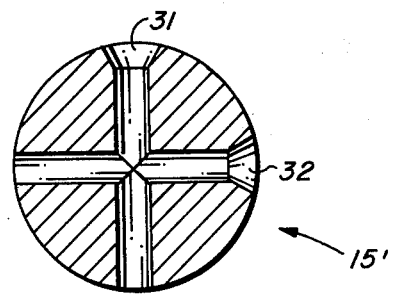

DRAG CHAIN SPROCKET

BACKGROUND OF THE INVENTION

This invention relates to sprockets for abrasion resistant drag-type feed chains such as commonly employed in feeding comminuted materials to processing vessels in chemical, metallurgical and other processing industries which are particularly resistant to high temperature, corrosive environments.

In certain industries, it is necessary to feed granular or comminuted materials to processing vessels such as furnaces, reactors and the like. Sometimes it is possible to feed these materials to such equipment by means of screw conveyors, belts, and other conventional solids-handling apparatus. However, in certain instances, particularly where the solid material is highly abrasive and also where high operating temperatures and corrosive atmospheres are encountered, it is necessary to employ so-called "drag chains." Such drag chains are typically endless belts formed by interconnecting metal links which are specially constructed to withstand the severe conditions encountered. For example, such drag chains are commonly employed to feed concentrates or calcined ores to the reverberatory furnaces in copper smelters.

The dry materials, either concentrate or calcined ore, are fed to the reverberatory furnace in a modern copper smelter through relatively small ports located in the ceiling of the furnace. These ports are spaced along the sides of the furnace at appropriate locations to form piles of the solid material along the walls of the furnace. These piles melt at their base and are continually replenished by the addition of further solid material at the top of the pile. Drag chains are employed to transport the solid materials from their storage point along channels in the feeding ports in the ceiling of the furnace. The drag chains are almost constantly subjected to the very corrosive gases produced in the furnace and are further subjected to high temperatures from the furnace itself and from the hot solid materials being fed to the furnace. This combination of corrosive atmosphere, high temperature, and abrasive material being handled presents a serious maintenance problem, necessitating frequent repair and replacement of the drag chain and the sprockets on which they are carried.

In the case of the typical sprocket construction the wear of the sprocket is further aggravated by the build-up of the abrasive materials between the sprocket and the chain. Because of the normally closed or solid construction of the sprocket, the entrapped material has no free avenue of escape, and as it collects it interferes with the normal operation of the sprocket and chain.

While the replacement of the chain is costly in terms of lost operating time for the equipment, the replacement of the sprocket represents an even greater expense because it typically involves a relatively more complete disassembly of the equipment. For this reason the teeth are sometimes designed to be removable from the main sprocket assembly to permit replacement of the teeth without removal of the main body of the sprocket. Because the cost of the teeth is significant in itself, it is important that the design of the sprocket and teeth should take this factor into account and should provide for long life and minimum cost also for the teeth.

DESCRIPTION OF THE PRIOR ART

U.S. Pat. Nos. 2,863,323, 3,069,922, 3,311,220 and 3,381,354 describe sprockets with replaceable teeth but the sprockets are of a flat construction that is not adaptable for use with drag chains and they do not encounter or need to contend with the build-up of abrasive material between the sprocket and the chain.

U.S. Pat. No. 1,630,313 is similar to the other prior art sprockets but it provides for the rotation of the teeth for the utilization of unworn surfaces.

In all cases the prior art sprockets of the aforementioned U.S. patents employ teeth in relatively complex shapes that must be cast or fabricated at considerable expense.

Accordingly, improved drag chain sprockets especially adapted to withstand the severe operating conditions encountered in feeding abrasive material to various pieces of processing equipment are needed.

SUMMARY OF THE INVENTION

In accordance with the invention claimed, an improved sprocket is provided for use with drag-type feed chains wherein an open sprocket construction is provided to prevent the build-up of abrasive materials and inexpensive, rotatable and replaceable teeth are provided to extend tooth life and to reduce the cost of maintenance and repair.

Accordingly, it is a principal object of the present invention to provide an improved sprocket for drag chains of the type employed for the feeding of abrasive materials to processing apparatus.

It is another object of the invention to provide such a sprocket which will withstand severe environmental conditions and heavy feed loads to a degree not possible in the sprockets of the prior art.

A further object of the present invention is to provide such a sprocket in an open form which resists build-up or clogging of the transported abrasive material and reduces the stresses and wear associated therewith.

A still further object of the invention is to provide such a sprocket in a form that utilizes inexpensive and readily replaceable teeth from materials that are commonly available.

A still further object of the invention is to provide a sprocket that utilizes replaceable teeth which may be varied in length and/or cross section on a given base structure allowing for use of different width chain links.

A still further object of the invention is to provide a sprocket that utilizes replaceable teeth of a type and configuration that readily permits the hardening of their working surfaces.

Yet another object of the invention is to provide such teeth in a form that permits the mounting position of the teeth to be altered thereby to utilize unworn surfaces of the teeth and thus extend the useful life to two or more times the tooth life that could otherwise be realized. The round teeth, in particular, are attached with standard bolts, washers and nuts and receive no internal threading of sprocket structure.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described with reference to the accompanying drawing, in which:

FIG. 5 is a cross-sectional view of the tooth of FIG. 4 as seen along line 5—5 of FIG. 4;

FIG. 6 is a side view of a variation of the sprocket of FIGS. 1-5 utilizing teeth of circular cross-section bolted to the sprocket;

FIG. 7 is an enlarged perspective view of one of the teeth of the sprocket of FIG. 6 but modified to show that the bolt holes may be tapered at their exposed end for receiving therein the head of a bolt; and FIG. 8 is a cross-sectional view of the tooth of FIG. 7 as seen along line 8—8 of FIG. 7.

DESCRIPTION OF THE PREFERRED EMBODIMENT

Figure 1:
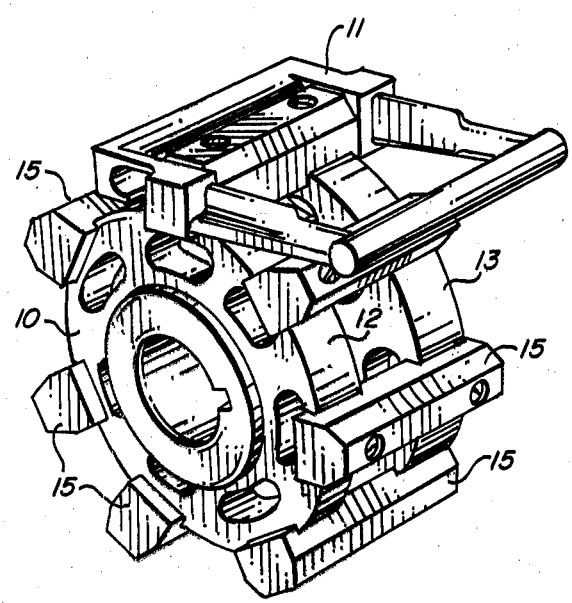
FIG. 1 is a perspective view of the improved sprocket of the invention shown engaging two interlocking links of a drag chain.
Figure 3:
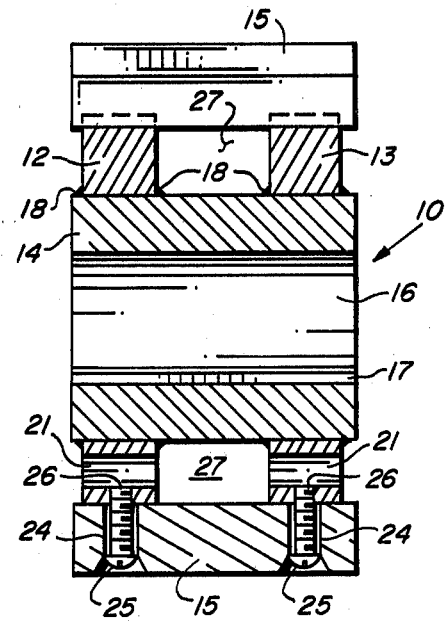
FIG. 3 is a cross-sectional view of the sprocket of FIG. 2 as seen along line 3—3 of FIG. 2.
Figure 2:
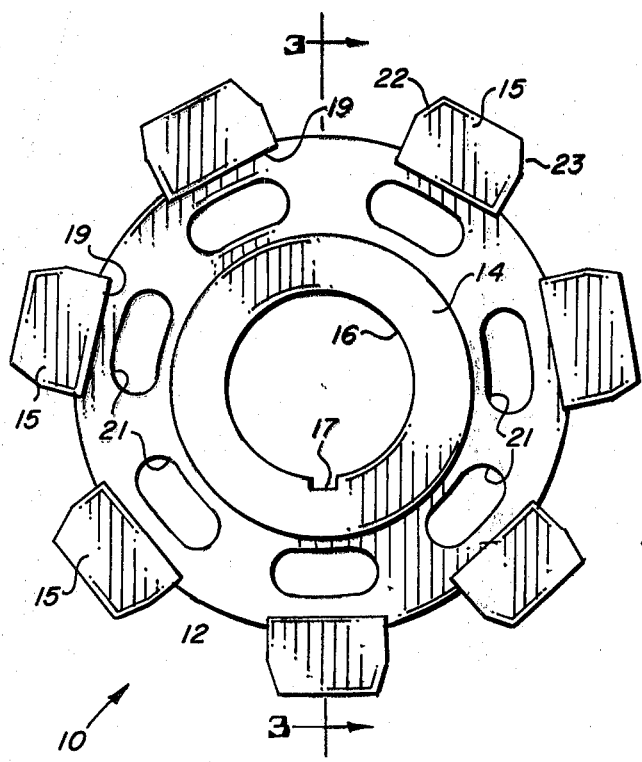
FIG. 2 is a side view of the sprocket of FIG. 1.
Figure 4:
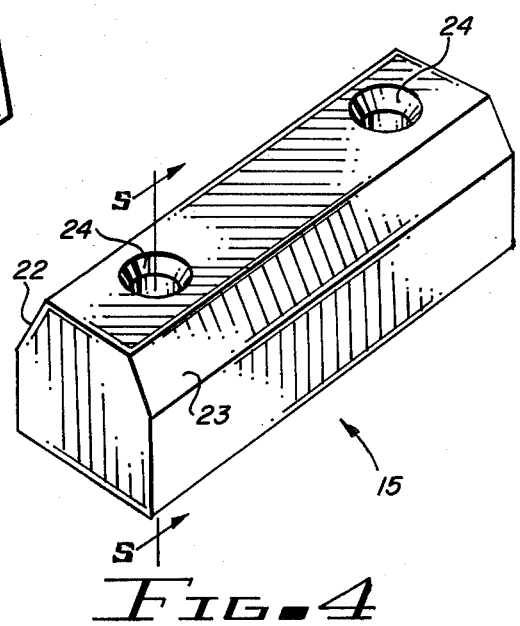
FIG. 4 is an enlarged perspective view of one of the replaceable teeth of the sprocket of FIGS. 1-3.

Referring more particularly to the drawings by characters of reference, FIGS. 1-3 disclose an improved sprocket 10 for a drag chain 11. Sprocket 10 comprises two spaced-apart plates or discs 12 and 13, a hub 14 and a plurality of teeth 15 bridging the discs 12 and 13.

Hub 14 is of a cylindrical configuration having an axial cylindrical opening 16 and a keyway 17 extending therethrough. Hub 14 may be readily machined from circular or tubular metal stock with discs 12 and 13 machined with a flat metal plate or suitably formed from castings. Discs 12 and 13 are formed in a ring shaped configuration so as to fit snugly over the outer surface of hub 14 where they are spacedly positioned and secured by welds 18, one at each end of hub 14. Uniformly spaced slots 19 are formed in the outer periphery of each of discs 12 and 13 to extend laterally thereacross for receiving therein teeth 15. As shown in FIG. 2, slots 19 are rectangular to match the rectangular cross-section of the bases of teeth 15. Spaced about the faces of discs 12 and 13 are a plurality of openings or holes 21 formed by casting or machining which reduce the weight of the sprocket and form escape ports for abrasive material.

Teeth 15 may be machined from rectangular metal bar stock with the rectangular cross-sectional configuration retained except for side surfaces 22 and 23 which may be appropriately tapered to mate properly with the cooperating working surfaces of the drag chain 11. Drilled recessed clearance holes 24 near the ends of teeth 15 are provided for receiving screws or bolts 25 which engage aligned tapped holes 26 at the centers of slots 19 to secure teeth 15 to discs 12 and 13. Alternatively the tapped holes 26 may be replaced by clearance holes with nuts employed to secure the bolts 25 in place. Access to the ends of the bolts is provided by holes 21.

One or the other of the surfaces 22 and 23 engages the cooperating mating surface of the drag chain 11, depending on the direction of the rotation of sprocket 10. In the view of FIG. 2, for example, if sprocket 10 is rotated counterclockwise as a driving sprocket to draw the chain 11 over the top of sprocket 10, surface 22 will serve as the working surface and will receive the resulting wear and abrasion. After a period of use such wear and abrasion render surface 22 unsuitable for further use. At this time tooth 15 is simply rotated end-for-end so that the unworn surface 23 now becomes the working surface. By this means the working or useful life of tooth 15 is effectively doubled. Furthermore, because of the simple rectangular bar configuration of teeth 15, surfaces 22 and 23 may be readily and inexpensively hardened for improved durability and extended life.

When chain 11 and sprocket 10 are employed in their intended mode of transporting abrasive materials, the transported materials tend to build up between the chain and sprocket where they account for additional stress and wear on the working surfaces of the moving parts of the assembly. In the case of sprocket 10, the open space 27 between discs 12 and 13 and openings 21 in discs 12 and 13 provide avenues of escape for the abrasive materials, thereby effectively reducing or eliminating the build-up and entrapment of these materials between the working surfaces of the chain and sprocket assembly. The associated wear and abrasion of the working surfaces 22 and 23 is thus also substantially reduced or eliminated.

In the modified embodiments of the invention as shown in FIGS. 6, 7 and 8, a sprocket 10' is utilized. Sprocket 10' is identical to sprocket 10 of FIGS. 1-5 except that teeth 15' of sprocket 10' have a circular rather than a rectangular cross-sectional configuration and are secured in cylindrical depressions 19' instead of rectangular slots. As shown in FIGS. 7 and 8, each of teeth 15' has two clearance holes 31 and 32 at each end thereof for securing teeth 15' in depressions 19'. Holes 31 and 32 intersect each other at right angles as shown in FIG. 8.

Using only holes 31, two mounting positions are possible, one of the two positions being obtained by turning the tooth 15' end-for-end. Two additional positions are achieved by rotating the tooth 15' 90 degrees about its axis and utilizing holes 31 in the same manner. By this means four working surfaces may be utilized on each tooth 15' so that a four-fold extension of the life of tooth 15' is achieved by simply altering its mounting position as a given surface becomes excessively worn. A further extension in life might be achieved by utilizing three intersecting clearance holes at each end of the tooth, the holes intersecting in this case at 120 degrees. It should be noted from FIGS. 6 and 7 that the teeth may have straight bores or bores with a tapered bore end so that suitable fasteners may be used entending above the surface of the tooth or below the outer periphery of the tooth as desired.

Because of the three-part construction of sprockets 10 and 10', i.e., the hub, discs and teeth, appropriate or optimum material may be chosen for each part. Selection of the material in each case may be based on resistance to shock abrasion, shear strength or other critical requirement. All three parts may be inexpensively procured from stock or formed or machined with the assembly of the individual parts being extremely simple and requiring no specialized tools or skills. Standard bolts, washers and nuts are recommended for installation of the round teeth. Thus, an effective and inexpensive long life drag chain is provided in accordance with the stated objects of the invention.

Although but two embodiments of the invention have been illustrated and described, it will be apparent to those skilled in the art that various changes and modifications may be made therein without departing from the spirit of the invention or from the scope of the appended claims.

What is claimed is:

1. A sprocket for a drag chain comprising:
a hub adapted to be mounted on a supporting shaft,
a pair of plates spacedly mounted on said hub to extend radially therefrom,
a plurality of equiangularly spaced recesses formed in said plates inwardly from their peripheries with each recess comprising axially aligned portions formed one in each plate and each portion extending across the full width of the plate, said plates having radially oriented fastener receiving apertures opening into said recesses
a plurality of individual teeth apertured for receiving fastener means,
said teeth being mounted one in each of said recesses wtih the chain engaging portion spanning at least distance between the outside surfaces of said plates and providing at least one chain engaging surfaces along its sides, and
fastener means for detachably mounting said teeth in said recesses,
whereby when said chain engaging surface of a tooth is worn, it may be removed from the associated recess and replaced.

2. The sprocket set forth in claim 1 wherein:
each of said teeth are provided with at least two chain engaging surfaces along its sides,
one surface being diametrically opposed to the other surface on the tooth,
whereby when one chain engaging surface of a tooth is worn, it may be removed from the associated recess and replaced in the same recess with its other surface positioned for engaging the chain.

3. The sprocket set forth in claim 2 wherein:
the periphery of said plates define a circular configuration.

4. The sprocket set forth in claim 2 wherein:
each of said teeth comprises a metallic elongated rectangular configuration having one chain engaging surface on each exposed side thereof.

5. The sprocket set forth in claim 2 wherein:
each of said teeth comprises an elongated cylindrical metallic bar.

6. The sprocket set forth in claim 2 wherein:
each of said plates is provided with a plurality of spacedly positioned apertures around its periphery which form ports for the movement therethrough of comminuted material trapped between said plates.

7. The sprocket set forth in claim 2 wherein:
said teeth are provided with apertures extending therethrough for cooperating with said means for detachably mounting said teeth in said recesses in one of two positions.

8. The sprocket set forth in claim 4 wherein:
said chain engaging surface on each exposed side thereof comprises a tapered portion forming one side of the crest of the tooth.

9. The sprocket set forth in claim 2 wherein:
said teeth are provided with apertures extending thereinto for cooperation with said means for detachably mounting said teeth in said recesses in one of two positions.

10. A sprocket for a drag chain comprising:
a hub adapted to be mounted on a supporting shaft,
a pair of plates spacedly mounted on said hub to extend radially therefrom,
a plurality of equiangularly spaced recesses formed in said plates inwardly from their peripheries with each recess comprising axially aligned portions formed one in each plate and each portion extending across the full width of the plate,
a plurality of individual teeth,
said teeth being mounted one in each of said recesses spanning the space between said plates and providing at least one chain engaging surfaces along its sides, and
means for detachably mounting said teeth in one of four positions in said recesses,
whereby when said chain engaging surface of a tooth is worn, said tooth may be removed from the associated recess and replaced in another of said positions in said recess.

* * * * *